United States Patent Office 3,459,401
Patented Aug. 5, 1969

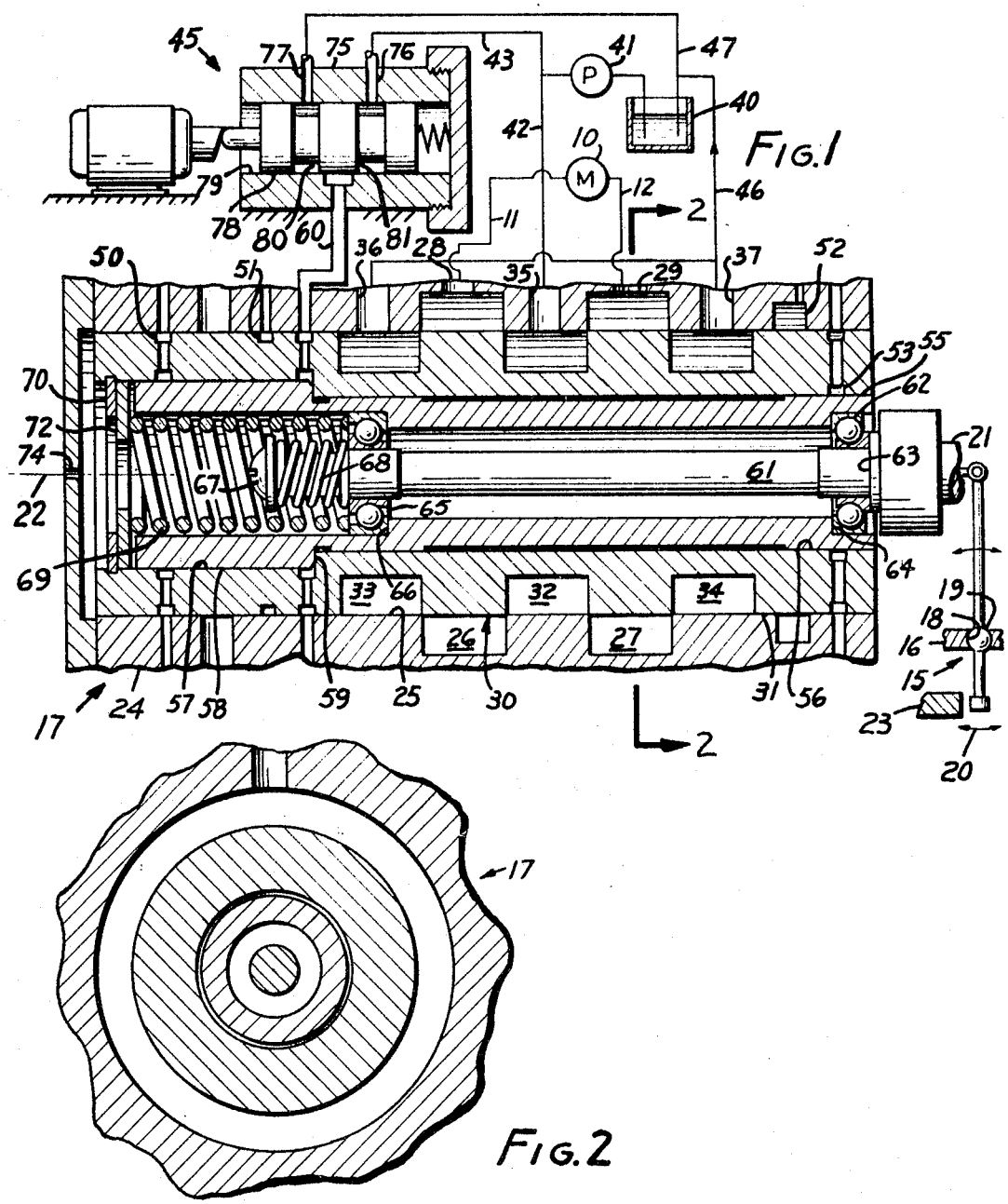

3,459,401
DITHERER AND TRACER VALVE ASSEMBLY
Paul J. Weaver, Pasadena, Calif., assignor to True-Trace Corporation, El Monte, Calif., a corporation of Connecticut
Filed Aug. 8, 1966, Ser. No. 570,840
Int. Cl. F16k 29/00; B23q 35/14
U.S. Cl. 251—3   2 Claims

ABSTRACT OF THE DISCLOSURE

This invention provides means to supply oscillation motion between the sleeve and spool of a spool valve, thereby to provide a pulsating output from the spool valve. The means comprises a bore in the spool, and a piston in the bore. The piston is connected to a stylus which is mounted to the sleeve and is the basic positioner for the spool relative to the sleeve. Means provide pulsating pressure within the bore and against a face of the piston and an associated pressure responsive face of the spool, thereby causing the said oscillatory motion.

---

This invention relates to tracer valves.

A tracer valve is frequently used as means for causing a cutting tool to travel a path in space relative to a workpiece that duplicates the path of the tracer valve stylus over a template or a pattern. The tracer valve itself is actuated by a stylus which remains in contact with the template or pattern. The stylus causes internal settings within the valve itself to be made which directs fluid under pressure to fluid motors in accordance with the deflection of the stylus.

It is an ideal objective in tracer valve designs to have a linear relationship between the stylus deflection and the rate of machine motor, in order to create an optimum part. However, a number of factors which are inherent in the value and in the fluid motor prevent a direct linear relationship. One troublesome factor is that in order to start a fluid motor in operation one must first overcome the inertia of the machine tool which it moves. Also, even in the most precise machine tools, there is the stick-slip effect, wherein uneven lubrication causes jerky or delayed motion at the start of a movement.

The foregoing effects are indirectly observable by watching a gauge in the pressure side of a fluid motor used to power a slide. When the pressure gradually builds up in the pressurized line, it will rise to some relatively high value before the machine tool starts to move. As soon as the machine tool component starts to move, the pressure drops to some lower level which will maintain the motion because inertial effects and effects of uneven lubrication have been ovrecome. Evidently a non-linear power relationship is needed at the start (or at very slow rates) if there is to be a direct geometrical correlation between the stylus deflection and machine tool movement, especially at slow speeds.

Some attempts have heretofore been made to provide non-linearity, such as by slanting, or otherwise "tailoring," the control edges of the interior mechanisms of tracer valves. The problem is that this concept requires an individual grinding configuration on the valve for each total system, and makes it inexpedient to manufacture quantities of identical valves for multiple applications.

It is an object of this invention to provide a means for creating a non-linear effect in a tracer valve, which non-linearity is of a nature that it is not "felt" by the tool which actually cuts the part.

This invention includes a tracer valve for controlling a machine tool, which tracer valve has a stylus intended to contact a pattern or template. This stylus is operatively connected to the tracer valve, and is the source of the control signal. The tracer valve is preferably but not necessarily of the spool type, the spool being axially slidable in a sleeve, the sleeve and the spool having interrelated groves and ports so that axial motion of the spool within the sleeve will cause appropriate pressure and exhaust connections to be made to a fluid motor, thereby to transmit power thereto. A feature of this invention resides in interposing pulsating means between the spool and the stylus, which means causes a relative oscillation between the spool and the sleeve, whereby intermittent and periodic pulsating effects are provided in the said fluid channels. This results in a predetermined average flow with peak forces which can overcome unfavorable stick-slip and uneven lubricant effects.

According to a feature of this invention, the spool is mounted to the stylus through a piston. The piston is exposed to a pulsating source of fluid under pressure whereby relatively to shift the spool and the piston to provide said oscillating motion.

The above and other features of this invention will be fully understood from the follownig detailed description and the accompanying drawings, in which:

FIG. 1 is an elevation, partly in a cutaway cross-section and partly in schematic relation, showing the presently preferred embodiment of the invention; and FIG. 2 is a cross-section taken at line 2—2 in FIG. 1.

The objective of the system shown in FIG. 1 is to control a bi-directional fluid motor 10 (such a motor may be either rotary or a piston-cylinder type) which in turn is connected to an element of a tracer controlled machine tool (not shown). This element might for example be one of the slides on the table of a milling machine, or perhaps the carriage of a lathe. Operation of the motor in one direction will drive the machine element in one direction, and reverse operation will drive it in a second, reverse, direction. The fluid under pressure to serve as power for the motor is derived from two motor supply lines 11, 12. It is the purpose of this invention to provide appropriate exhaust and pressure connections for motor supply lines 11 and 12.

A stylus 15 is mounted to a body 16 of tracer valve 17. It is mounted in a socket 18 by means of a ball-like member 19 and swings in the plane of FIG. 1 as indicated by arrow 20. It may be mounted for universal motion. It is customary, but not necessary, to mount such a stylus in the manner shown in the United States Patent No. 2,753,-145 to Rosebrook, to which reference may be had for full details. Because these details form no part of the instant invention, they are not set out here in full. The same is true of yoke means (not shown in this specification, but fully described in said Rosebrook patent), by means of which the stylus is connected to shaft 21 in order to impart motion to a valve element along axis 22 as a result of tilting motion of the stylus in the plane of FIG. 1. The connection is shown as a direct attachment in the figures, which also functions satisfactorily. Motion of the stylus is derived from contact with template 23, which has on its edge the configuration to be produced in a workpiece (not shown). The general arrangement of a tracer controlled machine tool of this type is shown in the aforesaid Rosebrook patent. The tracer valve is mounted to one machine tool element, and the template to another. The stylus bridges the gap and causes the elements to pursue a relative path between them that duplicates the contour of the template.

The tracer valve itself comprises a sleeve 24 fixed in the body which forms and has inside it a spool passage 25 which is centered on axis 22. The body is fixed to one of the machine tool elements. A pair of motor supply grooves 26, 27 are circumferentially formed in the inner wall of spool passages 25 and are connected through motor supply ports 28, 29 to motor supply lines 11, 12 respectively. A spool 30 includes an outer cylindrical peripheral surface 31 which makes a fluid sealing contact with the internal wall of the spool passage. This peripheral surface includes a peripheral pressure groove 32 and a pair of exhaust grooves 33, 34, one of the exhaust grooves being on each side of the pressure groove. A pressure port 35 extends through the sleeve to be in constant fluid communication with grove 32, and a pair of exhaust ports 36, 37 pierce the sleeve to make constant communication with exhaust grooves 33, 34, respectively.

From a reservoir 40, a pump 41 withdraws fluid and supplies it under pressure through pressure line 42 to pressure port 35. It also supplies a ditherer 45 through pressure line 43.

Exhaust line 46 branches to connect with both exhaust ports 36 and 37, and exhausts to reservoir. Exhaust line 47 exhausts from the ditherer to the reservoir. It will be observed that shifting spool 30 to the left in FIG. 1 will cause pressure grove 32 to overlap motor supply groove 26 and exhaust groove 34 to overlap motor supply groove 27. This will cause line 11 to be connected to pressure, and line 12 to exhaust. Motion of the spool to the right will cause the reverse situation, grooves 26 and 33 then overlapping to connect line 11 to exhaust and grooves 27 and 32 overlapping to connect line 12 to pressure. The rate of flow to these lines and through the motor will be determined by the clearance of the edges of the grooves, the greater the spool's axial displacement, the greater the clearance, the greater the flow, and the faster the motor operates.

Scavenger grooves 50, 51, 52, and 53 are formed to scavenge seepage oil from the device. They are all connected to a vacuum pump (not shown). A piston rod 55 is mounted in a bore 56 inside the spool. An enlarged cylinder 57 is formed in the bore near the left-hand end in FIG. 1. A piston 58 on rod 55 has a face 59 exposed to pressure from ditherer line 60.

The spool itself is mounted to the stylus through the inter-position of the piston, the piston being mounted to a stem 61 that is connected to shaft 21. A first bearing 62 bears against shoulder 63 on the stem and a shoulder 64 in the piston. A second bearing 65 bears against a shoulder 66 in the piston. A screw 67 in the end of the stem forces a spring 68 against the inner race of bearing 65. Another spring 69 presses the outer race of bearing 65 against shoulder 66. Snap ring 70 and backing washer 72 back up spring 69. Vent 74 vents the region to the left of the spool and piston in FIG. 1.

The ditherer itself may constitute any pulsating source. One example is shown in FIG. 1 which includes spool valve 75 that has a pressure port 76 and an exhaust port 77 respectively connected to lines 43 and 47. Spool 78 fits inside sleeve 79 and includes a pressure groove 80 and an exhaust groove 81. These grooves are respectively connected to lines 47 and 43.

The operation of this device is straightforward. The ditherer, as its motor turns its shaft, provides a pulsating positive force on the face of the piston which will periodically be relieved. The positive force is caused by shifting of the ditherer spool against the spring so that pressure is admitted to the inside of the enlarged portion of the bore where it will push the piston to the left relative to the spool. When the ditherer spool returns, this pressure is relieved through the exhaust line. Thus, there is a relative axial shift between the piston and the spool which will have an average value. This motion is at least in part opposed by the springs and is also at least in part transmitted to the stylus. When the stylus is free of the template, there is a mutual and divided oscillation of the piston, spool and stylus tip. When the stylus tip engages the template, however, the stylus ceases to oscillate and the oscillation occurs only between the piston and the spool. At this time the tracer valve spool oscillates about a null position in such a manner that the output of the spool is that which would be provided by a non-oscillating spool, and what is important to this invention, the oscillations have peak values, which peak values can overcome the effects of poor initial lubrication and the inertia of the device, thereby overcoming stick-slip effects. For example, even at an operative null, there are pressure pulses in the motor lines. These peak forces keep the whole system "alive" while the control still closely regulates the function of the machine tool on an accurate basis.

Pulsing means other than the ones shown in the drawings may be utilized. That which is illustrated is, however, a simple and reliable example.

I claim:

1. In a tracer valve having a pivotable stylus, and a spool valve responsive to deflections of said stylus, said spool valve comprising a sleeve having a spool passage with an axis, a spool axially shiftable in said spool passage, said spool and spool passage being grooved whereby to control the flow of fluid through the valve as a function of spool displacement relative to said sleeve, the improvement comprising: oscillating means disposed between and interconnecting the stylus and the spool comprising a bore in the spool, a piston in said bore, said piston being operatively connected to the stylus, and means for providing pulsating pressure within the bore and against a face of the piston and an associated pressure responsive face of said spool, whereby relative oscillatory movement can be provided between the spool and the stylus thereby to provide pulsating pressure flow in the output of the spool valve.

2. Apparatus according to claim 1 in which the spool and piston are rotatably mounted around their own axes relative to the stylus.

References Cited

UNITED STATES PATENTS

| 2,347,368 | 4/1944 | Rosen | 251—3 XR |
| 3,136,127 | 6/1964 | Weaver | 251—3 XR |
| 3,203,281 | 8/1965 | Jones et al. | 91—429 XR |

FOREIGN PATENTS

| 741,414 | 12/1955 | Great Britain. |

WILLIAM F. O'DEA, Primary Examiner

RICHARD GERARD, Assistant Examiner

U.S. Cl. X.R.

91—39; 137—330